United States Patent Office 3,310,521
Patented Mar. 21, 1967

3,310,521
ORGANOPOLYSILOXANE COMPOSITIONS
Burton B. White, Schenectady, N.Y., and Roger D. Jesse, Roselle, Ill., assignors to General Electric Company, a corporation of New York
No Drawing. Filed May 13, 1963, Ser. No. 280,080
1 Claim. (Cl. 260—37)

The present invention relates to curable organopolysiloxane compositions having controlled flow. More particularly, the present invention relates to curable materials useful for providing permanent dental impressions for protective mouthpieces, comprising a curable organopolysiloxane polymer and a flowable resilient organopolysiloxane reaction product, and to the mouthpieces produced thereby.

Mouthpieces for guarding teeth against damage resulting from active participation in so called "contact sports" generally consist of a flexible rubber or thermoplastic channel containing a softer curable material in which dental impressions can be made. Prior to the present invention, many of the available mouthpieces were undesirable because they either had limited service life, or could not be sterilized after repeated use, in an easy and desirable manner. A significant advance in the development of protective mouthpieces became possible, as shown by Ross Patent 2,919,693, as soon as organopolysiloxane compositions curable at room temperature were developed. The service life of protective mouthpieces has been dramatically extended. In addition, organopolysiloxane containing mouthpieces increase protection by providing for a better fit, and can be sterilized readily in boiling water without damage.

As known by those skilled in the art, organopolysiloxane compositions curable at room temperature, suitable for making protective mouthpieces initially require blending a curing catalyst into a curable mixture. In most instances, the blending of the curing catalyst into the curable mixture results in the production of an organopolysiloxane composition curable at room temperature having a particular pot life. In order to achieve optimum results however, the catalyst must be thoroughly dispersed throughout the curable mixture making it necessary to rely on the questionable technique or ability of the user. In addition, adverse results can happen if the ingredients of the organopolysiloxane composition curable at room temperature, are utilized after the shelf period recommended by the manufacturer. As a result, it is sometimes difficult to accurately determine the actual pot life of an organopolysiloxane composition curable at room temperature, even though the catalyst has been thoroughly dispersed throughout the curable mixture. Premature or unsatisfactory cure of the cured organopolysiloxane composition can produce an improperly fitted mouthpiece. In order to make a mouthpiece having an accurate and lasting dental impression from an organopolysiloxane composition curable at room temperature, the pot life of the curable mixture must be readily ascertainable and the curing catalyst must be uniformly dispersed throughout the mixture.

The present invention is based on the discovery that a curable organopolysiloxane composition having controlled flow can be obtained by blending in critical weight proportions a curable organopolysiloxane polymer, a peroxide curing catalyst, a reinforcing silica filler, and a flowable resilient reaction product of a polyorganosiloxane, a boron-oxygen-compound and ferric chloride. The aforesaid organopolysiloxane composition of the invention is ideally suited for making protective mouthpieces when it is incorporated into a standard flexible rubber or plastic mouthpiece liner. A temporary dental impression can be produced directly by the user by merely biting into the curable organopolysiloxane composition for a few seconds. A protective mouthpiece having an accurate and permanent dental impression then can be easily made by quickly removing the mouthpiece and placing it in boiling water for a few minutes, to effect the cure of the curable organopolysiloxane composition.

The curable organopolysiloxane compositions of the present invention comprise (1) 100 parts of a curable organopolysiloxane polymer having a viscosity of at least 100,000 centipoises at 25° C., of the formula, (1)  $(R)_a SiO_{(4-a)/2}$ (2) 25 parts to 300 parts of the flowable resilient product of reaction at a temperature between 60° C. to 250° C. of a mixture comprising:
    (a) 100 parts of a polyorganosiloxane comprising chemically combined units having the formula, (2) 

$$-\underset{\underset{CH_3}{|}}{\overset{\overset{CH_3}{|}}{Si}}O-$$

(b) 1 to 20 parts of a boron-oxygen-compound selected from a boron oxide, and an organoborate, and
    (c) 0.05 to 5 parts of ferric chloride,
(3) 5 to 50 parts of a silica filler, and
(4) 1 to 12 parts of a peroxide curing catalyst, where R is a member selected from monovalent hydrocarbon radicals, halogenated monovalent hydrocarbon radicals, and cyanoalkyl radicals, $a$ is equal to from 1.95 to 2.01, inclusive.

Radicals included by R of Formula 1 are aryl radicals, halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl, including methyl, ethyl, propyl, chlorobutyl, cyclohexyl, etc.; cyanoethyl, cyanopropyl, cyanobutyl, etc. R can be all the same radical or any two or more of the aforementioned R radicals. R is preferably methyl.

The curable organopolysiloxane polymers operable in the present invention, shown above by Formula 1 can be viscous masses or gummy solids depending upon such factors as the state of condensation of the starting organopolysiloxane, polymerizing agent, etc. These organopolysiloxanes are convertible to the cured, solid, elastic state by employing a conventional curing catalyst. Examples of these organopolysiloxanes are shown in Agens Patent 2,448,756, Sprung et al. Patent 2,448,556, Sprung Patent 2,484,595, Krieble et al. Patent 2,457,688, and Marsden Patent 2,521,528—all the foregoing patents being assigned to the same assignee as the present invention. The curable organopolysiloxane polymers employed in the practice of the present invention can be made by condensation of a liquid organopolysiloxane containing an average of about 1.95 to about 2.01 R radicals as defined in Formula 1 per silicon atom including cyclic polydiorganosiloxane, such as octamethylcyclotetrasiloxane, by means of conventional polymerizing agents that include for example, ferric chloride-hexahydrate, phenylphosphoryl chloride, and various alkaline condensing agents such as potassium hydroxide, sodium hydroxide, etc. Where alkenyl radicals are attached to silicon by carbon-silicon linkages in the polymers of Formula 1, it is preferable that the alkenyl radicals (for instance, vinyl groups, allyl groups, etc.) be present in an amount equal to from 0.05 to 2 mole percent of the total number of organic radicals in the organopolysiloxane polymer that are attached to silicon through carbon-silicon linkages.

The boron-oxygen-compounds that can be employed to make the flowable resilient reaction product of the present invention include for example, boron oxides such as pyroboric acid ($H_2B_4O_7$), boron oxide ($B_2O_3$), etc. In addition, organoborates having the formula, (3) $$R'\left(\begin{matrix}O-B\\|\\OX\end{matrix}\right)_m -O-B-OX \atop OX$$

and cyclic borate esters, (4) $$(R'OBO)_y$$

can also be employed, where $m$ is a whole number equal to from 0 to 3, $y$ is an integer equal to from 3 to 5, R' is a member selected from an aryl radical, an alkyl radical, and mixtures thereof, and X is a member selected from the class of hydrogen and R'.

Radicals included by R' of Formulae 3 and 4 are more particularly phenyl, tolyl, naphthyl, etc. and methyl, ethyl, propyl, butyl, etc. radicals. Specific examples of the organoborates of Formula 3 are triphenylborate, trimethylborate, etc. A specific example of a borate ester within the scope of Formula 4 is trimethylboroxine.

Included among the polyorganosiloxanes that can be employed for making the flowable resilient reaction product are polymethylsiloxanes having the formula, (5) $$(CH_3)_bSiO_{(4-b)/2}$$

where $b$ can vary between 1.85 to 2.01. Some of the polymethylsiloxanes of Formula 5 and their properties are more particularly shown in Silicones, by Robert N. Meals and Frederick M. Lewis, Reinhold Publishing Corp. (1959), on pages 16–34. For example, included by Formula 5 are poly(dimethylsiloxane) fluids having a viscosity of from 50 centipoises or below, to as high as 100,000 centipoises or higher at 25° C. Polyorganosiloxanes that can be employed to make the flowable resilient product also include silanol stopped poly(dimethylsiloxane) having from 3 to 1,500 chemically combined dimethylsiloxy units, as well as cyclic polysiloxanes for example, octamethylcyclotetrasiloxanes. In addition, the polyorganosiloxanes can have chemically combined siloxy units in which alkenyl radicals such as vinyl, and aryl radicals such as phenyl are attached to silicon by carbon-silicon linkages.

The silica fillers that have been found to be operable in the present invention are finely divided powders having a particle size in the range of .01 to 50 mircons. These fillers can be made by precipitation or aerosol-aerogel methods, by vapor phase burning of silicon tetrachloride or ethyl silicate, or by such means as mechanical attrition of quartz. According to the method of manufacture, the silica fillers can contain hydroxyl radicals or alkoxy radicals bound to silicon atoms. Examples of such silica fillers are described in U.S. Patents 2,541,137, 2,610,167 and 2,657,149.

In making the flowable resilient reaction product of the present invention, a uniform mixture is formed of the polyorganosiloxane, the boron-oxygen-compound and ferric chloride either in an anhydrous form or as a hexahydrate. The mixture is heated and agitated until there is substantial increase in viscosity. The resulting product is then allowed to cool to room temperature.

The order in which the various ingredients are added together is not critical. A preferred procedure is to add the boron-oxygen-compound to a mixture of the polyorganosiloxane and the ferric chloride catalyst. Preferably, there is utilized per 100 parts of polyorganosiloxane, 3 to 10 parts of boron-oxygen-compound and 0.1 to 1 part of ferric chloride. The temperature employed to effect the reaction between the various ingredients of the mixture can vary widely. Experience has shown however, that it is desirable to heat the mixture to a temperature of at least about 75° C. before the ferric chloride is added. After the reaction has been initiated, external heat can be utilized advantageously to maintain the reaction temperature at about 150° C. to as high as 200° C. or higher.

In order to provide for a maximum degree of dispersion of the various ingredients, the reaction can be conducted in a mixing means, such as a doughmixer, or a suitable container having a stirrer. Generally, the reaction will be completed after 1 hour to 3 hours, although as many as 5 hours or more, in particular circumstances will not be unusual.

During the formation of the flowable resilient reaction product, silica filler can also be utilized, if desired, in varying amounts; silica filler also can be blended subsequently with the flowable resilient reaction product along with the polymer and curing catalyst. Optionally, the flowable resilient reaction product also can be modified with various softeners such as oleic acid, or ferric stearate, glycerol, etc.; pigments, etc.

In the practice of the invention, the curable organopolysiloxane composition having controlled flow can be made by milling a mixture of the curable organopolysiloxane polymer, the flowable resilient reaction product, the filler, and the curing catalyst. Preferably, from 80 to 110 parts of the flowable resilient reaction product, and from 2 to 6 parts of peroxide per 100 parts of the curable polymer is employed in making the curable organopolysiloxane composition.

In forming the curable organopolysiloxane composition, the order of addition of the various components is not critical. It is preferred however, to incorporate the curing catalyst after the other components have been uniformly milled together. Among the curing catalysts that can be employed in the production of the curable organopolysiloxane compositions are for example, benzoyl peroxide, bis-(2,4-dichlorobenzoyl) peroxide, ditertiarybutyl peroxide, decanoyl peroxide, etc.

The curable organopolysiloxane composition can be incorporated into a suitable flexible liner or channel by the fabricator which can be custom fitted in accordance with the size requirements of the user. Suitable flexible liners can be of silicone rubber, polyvinyl chloride, various types of polyethylene, polypropylene, etc. In addition, the liner can be pretreated with a pressure sensitive adhesive, if desired, such as shown for example by Goodwin Patent 2,857,356, assigned to the same assignee as the present invention.

In order that those skilled in the art will be better able to practice the invention, the following examples are given by way of illustration and not by way of limitation. All parts are by weight.

*Example 1*

A flowable resilient reaction product was made by the following method.

One hundred parts of polydimethylsiloxane in the form of a mixture of a major amount of octamethylcyclotetrasiloxane and a minor amount of methylsiloxane having vinyl and phenyl radicals attached to silicon by carbon-silicon linkages was heated in a doughmixer. When the batch reached a temperature of 60° C., 5.6 parts of boron oxide ($B_2O_3$) was added while the mixture was stirred. When the mixture reached a temperature of 90° C., 0.2 part of anhydrous ferric chloride was added in the form of a slurry in a polydimethylsiloxane oil. The batch was heated for 2¾ hours at a temperature between 150° C. to 160° C. A flowable resilient reaction product was formed when the mixture was allowed to cool to room temperature.

One hundred parts of the above flowable resilient reaction product was then mixed in a doughmixer and blended with 1.75 parts of ferric stearate. There was then slowly added to the resulting blend about 9 parts of a silica filler and 3 parts of titanium oxide. After the mixture was thoroughly mixed, and when it became uniform, 3.3 parts of glycerol were added.

Equal parts of the above flowable resilient reaction product and a curable organopolysiloxane polymer having a viscosity of about 7,000,000 centipoises at 25° C.

in the form of a polymethylsiloxane containing 0.2 mole percent of chemically combined methylvinylsiloxane units based on the total of chemically combined siloxy units and an average of about 2 methyl radicals per silicon atom, were milled on a rubber mill. There were added to the mixture, about 20 parts of fumed silica per 100 parts of the curable organopolysiloxane polymer. There were also added two parts of benzoyl peroxide per 100 parts of the mixture of the flowable resilient product and the curable organopolysiloxane polymer.

The resulting curable organopolysiloxane composition was inserted into a vulcanized silicone rubber liner. Impressions were then made by biting into the curable organopolysiloxane composition. The mouthpiece was put in boiling water for 10 minutes immediately upon removal from the mouth. The mouthpiece was then recovered from the boiling water and it was found to have permanent dental impressions and yet was still flexible enough to be easily held in the mouth without irritation. When replaced into the mouth, the fit was excellent.

Based on the above results, those skilled in the art would know that the curable organopolysiloxane compositions of the present invention provide for the production of mouthpieces having marked advantages over those made by prior art methods. The mouthpieces of the present invention for example, are not adversely affected by extended shelf periods and can be formed in a few seconds by merely biting into the curable organopolysiloxane composition and then curing the mouthpiece in boiling water. In addition, the mouthpieces of the present invention do not require any blending of catalyst by the user, and possess all the outstanding properties of organopolysiloxane compositions with respect to ease of sterilizing, durability, non-toxicity, comfort, lack of unpleasant taste, etc.

While the foregoing example has of necessity been limited to only a few of the very many variables within the scope of the present invention, it should be understood that the present invention shows a much broader class of curable organopolysiloxane compositions comprising a curable organopolysiloxane polymer and a flowable resilient organopolysiloxane reaction product.

What we claim as new and desire to secure by Letters Patent of the United States is:

A mouthpiece consisting of a flexible silicone rubber liner containing the composition consisting essentially of
(1) 100 parts of a curable organopolysiloxane polymer having a viscosity of at least 100,000 centipoises at 25° of the formula $$(R)_a SiO_{(4-a)/2}$$

(2) 25 parts to 300 parts of the flowable resilient product of reaction at a temperature between 60° C. to 250° C. of a mixture comprising,
  (a) 100 parts of a polyorganosiloxane consisting essentially of chemically combined units having the formula $$-\underset{\underset{CH_3}{|}}{\overset{\overset{CH_3}{|}}{Si}}O-$$

(b) 1 to 20 parts of a boron-oxygen-compound selected from the class consisting of a boron oxide and an organoborate, and
  (c) 0.05 to 5 parts of ferric chloride,
(3) 5 to 50 parts of a silica filler, and
(4) 1 to 12 parts of a peroxide curing catalyst, where R is a member selected from the class consisting of monovalent hydrocarbon radicals, halogenated monovalent hydrocarbon radicals, and cyanoalkyl radicals, and $a$ is equal to from 1.95 to 2.01, inclusive.

References Cited by the Examiner
UNITED STATES PATENTS

| | | | |
|---|---|---|---|
| 2,448,565 | 9/1948 | Wright et al. | 260—37 |
| 2,541,851 | 2/1951 | Wright | 260—37 |
| 2,721,857 | 10/1955 | Dickmann | 260—37 |
| 2,919,693 | 1/1960 | Ross | 128—136 |

FOREIGN PATENTS

| | | |
|---|---|---|
| 662,735 | 5/1963 | Canada. |
| 1,248,775 | 11/1960 | France. |
| 1,120,689 | 12/1961 | Germany. |

MORRIS LIEBMAN, *Primary Examiner.*

A. H. KOECKERT, J. FROME, *Assistant Examiners.*